US007855683B2

(12) United States Patent
Razoumov et al.

(10) Patent No.: US 7,855,683 B2
(45) Date of Patent: Dec. 21, 2010

(54) METHODS AND APPARATUSES FOR GPS COORDINATES EXTRAPOLATION WHEN GPS SIGNALS ARE NOT AVAILABLE

(75) Inventors: Leonid Razoumov, Riverdale, NY (US); Saeed Ghassemzadeh, Andover, NJ (US); Robert Miller, Convent Station, NJ (US)

(73) Assignee: AT&T Intellectual Property I, L.P., Reno, NV (US)

( * ) Notice: Subject to any disclaimer, the term of this patent is extended or adjusted under 35 U.S.C. 154(b) by 219 days.

(21) Appl. No.: 12/264,564

(22) Filed: Nov. 4, 2008

(65) Prior Publication Data

US 2010/0109948 A1    May 6, 2010

(51) Int. Cl.
    *G01S 19/42* (2010.01)
(52) U.S. Cl. .................................. 342/458; 342/357.25
(58) Field of Classification Search ............ 342/357.14, 342/357.25
    See application file for complete search history.

(56) References Cited

U.S. PATENT DOCUMENTS

| 6,268,824 | B1 * | 7/2001 | Zhodzishky et al. ... 342/357.04 |
| 2009/0138199 | A1 * | 5/2009 | Bonanni et al. ............. 701/214 |
| 2009/0273559 | A1 * | 11/2009 | Rofougaran et al. ........ 345/156 |

* cited by examiner

*Primary Examiner*—Thomas H Tarcza
*Assistant Examiner*—Harry Liu
(74) *Attorney, Agent, or Firm*—Parks IP Law LLC; Mickki D. Murray, Esq.

(57) ABSTRACT

Systems and methods for extrapolating GPS coordinates beyond line of sight are disclosed. A coordinate extrapolation system (CES) can include a memory, a processor, and a GPS receiver. The CES can receive GPS signals and determine GPS coordinates corresponding to a location. If GPS signals are unavailable, the CES models the surface of the earth and extrapolates the GPS coordinates corresponding to the location at which GPS signals are unavailable. Methods for extrapolating the GPS coordinates and calibrating the CES are also disclosed.

20 Claims, 7 Drawing Sheets

METHODS AND APPARATUSES FOR GPS COORDINATES EXTRAPOLATION WHEN GPS SIGNALS ARE NOT AVAILABLE

TECHNICAL FIELD

The present disclosure relates generally to Global Positioning System (GPS) and, more particularly, to methods and apparatuses for GPS coordinates extrapolation when GPS signals are not available.

BACKGROUND

GPS is a navigation system composed of satellites in orbit and ground stations, for example, GPS receivers, for receiving signals from the satellites. With GPS, one can determine the location of any ground station by analyzing signals from multiple satellites. Typically, each GPS satellite used for position determination includes a transmitter and a precision clock. The GPS satellites transmit a spread-spectrum GPS signal containing time and implicit carrier phase information. A ground station receives the GPS signal and the time the signal was sent. The GPS receiver can use arrival time and phase of each GPS satellite signal to calculate the location of the receiver by determining how far away each satellite is from the receiver.

As is known, a single measurement is generally not adequate to determine the position of the GPS receiver. As such, GPS receivers often perform a process known as trilateration, wherein multiple signals and transmission times are used to determine the three-dimensional position of the receiver. If three GPS signals and corresponding transmission times are known, the GPS receiver can generally determine a location, depending on how satellites are distributed in the sky and whether the receiver can use certain assumptions regarding a known location parameter (e.g. altitude) to remove unknowns in the trilateration computation. Four satellites are usually needed to determine both location and elevation of the receiver. In the event that the GPS receiver does not have an accurate clock, the fourth satellite can be used to make the measured location more precise by correcting some of the clock error. The fourth satellite may also be used to determine an elevation, though the errors in determining elevation are typically greater than the errors that can arise in determining latitude and longitude.

Unfortunately, calculating exact distances on the Earth and converting them to latitude/longitude coordinates is a complicated process and generally requires the use of complicated expressions provided by the U.S. Geological Survey, which are quite complex. The earth is not spherical, but rather, an irregular mass that more closely approximates a biaxial ellipsoid than a sphere. The two radii of the earth, the polar radius and the equatorial radius, respectively, range from about 6,356.75 km to about 6,378.14 km, or about 3,949.9 miles to about 3,963.19 miles. Because of the surface irregularities, complex datasets exist to be used by GPS receivers to estimate elevation based upon an approximated radius of the earth at the current location. These complicated data sets, specific for granular regions of the Earth's surface, are generally relied upon not only for elevation determination, but also to obtain an accurate representation of the distance between two points. Using these methods and datasets can result in more accurate position determinations, but can be a computationally intensive process.

During movement of the GPS receiver, readings can be taken at intervals to reflect movement. In general, the GPS receiver can calculate and display the current location as long as the GPS receiver can receive GPS signals. At times, however, the GPS receiver cannot receive GPS signals and may not be able to accurately calculate and display the current location. For example, if the GPS receiver enters a tunnel, a built-up area such as, for example, a city with tall buildings, an area with irregular terrain, or another location in which the GPS satellites are out of the GPS receiver's line of sight, it is possible to lose a satellite fix and, consequently, the ability of the GPS receiver to determine the current location of the GPS receiver.

In such areas, an alternative method of obtaining coordinates through extrapolation of position can be useful. When a GPS fix is lost, some known GPS receivers attempt to estimate a current position based upon a prior location, a known speed and bearing, and known map data. For example, an automobile with a GPS navigation system may display a position even when GPS signals have been lost, e.g., in a tunnel. Some GPS navigation systems accomplish this by using the last known position, bearing, speed, and map data to estimate current location. When the GPS signals are again acquired, there can be typically a correction step to move the estimated location to the actual location.

The applicants have discovered that errors in excess of 5-10 meters are common when using such methods of extrapolation. While errors of 5-10 meters can be adequate for automobile navigation, in which a driver still relies upon roads to guide the vehicle, errors of this magnitude can be too great for fine applications in which more precise measurements are needed.

SUMMARY

The present disclosure describes how a precise location can be quickly and accurately determined at a location in which GPS signals are not available using GPS receivers with low power and low computational ability, and without using complex data sets and models. Such GPS receivers can be used, for example, in cellular telephones, in portable computing devices, in portable navigation devices, in portable data acquisition tools, when taking RF propagation measurements in built-up areas, or in areas with irregular terrain, and the like. Such portable GPS devices often have low power and reduced computational ability due to, for example, power and space constraints.

According to an embodiment of the present disclosure, a tangential plane approximation is used for points that are within a determined distance. In some applications, the distance is 2 kilometers. In some applications, the distance is 1 kilometer. In other applications, the distance ranges from about 5 meters to about 3 kilometers. For points that are within the determined distance, the tangential approximation is highly accurate and can allow simplifications of latitude/longitude determinations.

The applicants have found that GPS coordinates extrapolation according to the present disclosure can provide data that is accurate to ranges within 1-4 centimeters, i.e., roughly 0.2% to 0.4% of the error determined using other coordinates extrapolation methods, i.e., 5-10 meters. Instead of basing the estimated GPS coordinates upon a complicated model of the earth, a complex dataset, and intensive calculations, an embodiment of the GPS coordinates extrapolation according to the present disclosure includes, inter alia, modeling the earth as a spherical surface, and using a plane that is tangential to the modeled spherical surface to extrapolate positions in 2 dimensions.

As explained above, the earth is neither a spherical nor planar surface. The earth is an irregular mass that is more closely approximated by a biaxial ellipsoid. Therefore, coordinates obtained by extrapolating with a planar model would be expected to be less accurate than readings obtained using complex models and GPS data. However, the Applicants have found that the coordinates obtained using the disclosed systems and methods can be extremely accurate, or even more accurate than more complex modeling methods. Furthermore, the Applicants have found that the disclosed systems and methods can be embodied in simpler devices and systems with less computing power.

According to an exemplary embodiment of the disclosure, a first location $(x_1, y_1, z_1)$ is determined using a GPS receiver. A second location $(x_2, y_2, z_2)$ is also determined using the GPS receiver. At a third location $(x_3, y_3, z_3)$, however, the GPS receiver is unable to determine a location. For example, the GPS may be unable to receive GPS signals due to natural or artificial structures, cloud cover, irregular surface terrain, overgrowth, an inadequate power source, electrical interference, and the like. To determine the coordinates corresponding to the third location $(x_3, y_3, z_3)$, some embodiments of the present disclosure include modeling the earth's surface as a substantially spherical surface with a constant radius, a model that is known to be an inaccurate model of the earth. The three locations $(x_1, y_1, z_1)$, $(x_2, y_2, z_2)$, $(x_3, y_3, z_3)$ can be converted to spherical coordinates by using the conversions:

$x = R(\sin(\theta)\cos(\phi))$;

$y = R(\sin(\theta)\sin(\phi))$; and $z = R(\cos(\theta))$

Converting to spherical coordinates allows a point (x,y,z) to be represented as:

$R[\sin(\theta)\cos(\phi); \sin(\theta)\sin(\phi); \cos(\theta)]$

According to some embodiments of the present disclosure, the three points $(R_1, \theta_1, \phi_1)$, $(R_2, \theta_2, \phi_2)$, $(R_3, \theta_3, \phi_3)$ are assumed to exist on the surface of a spherical earth with a constant Radius. According to the present disclosure, a tangential plane can be modeled at one of the points, allowing the three points to be modeled as co-planar points, represented as $(\phi_1, \phi_1)$, $(\theta_2, \phi_2)$, and $(\theta_3, \phi_3)$.

The tangential plane basis vectors can be calculated as:

$d_\theta s = R[\cos(\theta)\cos(\phi); \cos(\theta)\sin(\phi); -\sin(\theta)]d\theta$, and $d_\phi s = R\sin(\theta)[-\sin(\phi); \cos(\phi); 0]d\phi$.

These vectors can be represented in a simplified form as:

$e_\theta = [\cos(\theta)\cos(\phi); \cos(\theta)\sin(\phi); -\sin(\theta)]$, and $e_\phi = [-\sin(\phi); \cos(\phi); 0]$ As such, any vector ds on the tangential plane defined by the vectors $e_\theta$ and $e_\phi$ can be expressed as:

$ds = R(e_\theta d\theta + e_\phi \sin(\theta)d\phi)$

In some embodiments, the three points are substantially co-linear. By extrapolating a distance vector d ($\vec{d}$) through a unit vector u ($\vec{u}$), expressing u and d as spherical coordinates, and introducing the notation $\delta\theta_{ij} = \theta_i - \theta_j$, the following equations are obtained:

$$u = \frac{(e_{\theta_2}\delta\theta_{12} + e_{\varphi_2}\sin(\theta_2)\delta\phi_{12})}{\sqrt{\delta\theta_{12}^2 + \sin^2(\theta_2)\delta\phi_{12}^2}},$$

$$d = R(e_{\theta_2}\delta\theta_{32} + e_{\varphi_2}\sin(\theta_2)\delta\varphi_{32}),$$

and $$R(e_{\theta_2}\delta\theta_{32} + e_{\varphi_2}\sin(\theta_2)\delta\varphi_{32}) = \frac{|d|}{\gamma}(e_{\theta_2}\delta\theta_{21} + e_{\varphi_2}\sin(\theta_2)\delta\varphi_{21})$$

By using these relationships for three substantially co-linear points $(\theta_1, \phi_1)$, $(\theta_2, \phi_2)$, and $(\theta_3, \phi_3)$, the coordinates $(\theta_3, \phi_3)$ of the third point can be extrapolated as:

$$\theta_3 = \theta_2 + \frac{d}{R\gamma}\delta\theta_{21}$$

and $$\varphi_3 = \varphi_2 + \frac{d}{R\gamma}\delta\theta_{21},$$

where $$\gamma = \sqrt{\delta\theta_{21}^2 + \sin^2(\theta_2)\delta\varphi_{21}^2}$$

The extrapolated coordinates can be converted to latitude and longitude, and an effective radius can be calculated as part of a calibration process. If such a step is used, the effective radius can be computed as $$\tilde{R}_\theta = \frac{d}{\gamma}\frac{\delta\theta_{21}}{\delta\theta_{32}},$$

and $$\tilde{R}_\theta = \frac{d}{\gamma}\frac{\delta\varphi_{21}}{\delta\varphi_{32}},$$

where $$\gamma = \sqrt{\delta\theta_{21}^2 + \sin^2(\theta_2)\delta\varphi_{21}^2} \text{ and } \tilde{R}_\theta \approx \tilde{R}_\varphi$$

In some embodiments, the three points are not substantially co-linear. Instead, a first line a passes through the points $(\theta_1, \phi_1)$ and $(\theta_2, \phi_2)$. Additionally, a second line d passes through the points $(\theta_2, \phi_2)$, and $(\theta_3, \phi_3)$. Finally, a third line b passes through the points $(\theta_1, \phi_1)$, and $(\theta_3, \phi_3)$. The first line and the second line are rotationally offset by an angle α. By extrapolating vector a ($\vec{a}$) using the length of vector d ($\vec{d}$), the angle α, introducing a rotation matrix $R(\alpha)$, and vector u=a/|a|, one can express the extrapolating of $\vec{d}$ as:

$b-a=|d|R(\alpha)u=|d|/|a|R(\alpha)a$

As such, coordinate representations of the vectors can be obtained as:

$\vec{a} = R(e_\theta \delta\theta_{21} + e_\phi \sin(\theta)\delta\phi_{21})$ and $\vec{b} = R(e_\theta \delta\theta_{31} + e_\phi \sin(\theta)\delta\phi_{31})$ By taking separate projections onto the basis vectors $e_\theta$ and $e_\phi$, one can obtain the following relationships:

$\delta\theta_{32} = (\cos(\alpha)\delta\theta_{21} - \sin(\alpha)\sin(\theta)\delta\phi_{21})|\vec{d}|/|\vec{a}|$ and $\sin(\theta)\delta\phi_{32} = (\sin(\alpha)\delta\theta_{21} + \cos(\alpha)\sin(\theta)\delta\phi_{21})|\vec{d}|/|\vec{a}|$ By using these relationships for three points $(\theta_1, \phi_1)$, $(\theta_2, \phi_2)$, and $(\theta_3, \phi_3)$, the coordinates $(\theta_3, \phi_3)$ of the third point can be extrapolated as $$\theta_3 = \theta_2 + \frac{d}{R\gamma}(\cos(\alpha)\delta\theta_{21} - \sin(\alpha)\sin(\theta_{1or2})\delta\varphi_{21})$$

and $$\varphi_3 = \varphi_2 + \frac{d}{R\gamma}\left(\cos(\alpha)\delta\varphi_{21} + \sin(\alpha)\frac{1}{\sin(\theta_{1or2})}\delta\theta_{21}\right),$$

where $$\gamma = \sqrt{\delta\theta_{21}^2 + \sin^2(\theta_2)\delta\varphi_{21}^2}.$$

The extrapolated coordinates can be converted to latitude and longitude, and an effective radius can be calculated as part of a calibration process. If such a step is used, the effective radius R can be computed as $$R = \frac{d_{21}}{\sqrt{\delta\theta_{21}^2 + \sin^2(\theta)\delta\varphi_{21}^2}}.$$

As will be explained below, the most computationally intense calculation made during extrapolation can be the calculation of sine and/or cosine values. To further simply the calculations, an embodiment of the present disclosure includes storing tables of sine and cosine values in a memory or using approximations such as, for example, a coordinate rotation digital computer (CORDIC) algorithm. As such, sine and cosine values can be stored in table format to further reduce the amount and intensity of calculations needed to extrapolate the coordinates of the third point.

Accordingly, an embodiment of the present disclosure includes a method for extrapolating Global Positioning System (GPS) coordinates beyond line of sight. The method includes using a GPS signal receiver to determine coordinates that correspond to a first location; using the GPS signal receiver to determine coordinates that correspond to a second location; measuring a distance from the second location to a third location, wherein the GPS signal receiver cannot receive a GPS signal at the third location; determining a vector on a plane that is substantially tangential to the second location; and extrapolating, using the vector and the distance between the second location and the third location, coordinates that correspond to the third location. The determining a vector can include determining at least two basis vectors of a tangential plane that is substantially tangential to the second location.

In some embodiments, an angle $\alpha$ between a first line and a second line can be determined. The first line passes through the first location and the second location, and the second line passes through the second location and the third location. The angle $\alpha$, and the distance between the second location and the third location can be used to extrapolate GPS coordinates that correspond to the third location.

In some embodiments, the first location includes a second point at which GPS coordinates are known, and the second location includes a first point at which GPS coordinates are known. In some embodiments, the first location includes a first point at which GPS coordinates are known, and the second location includes a second point at which GPS coordinates are known. In some embodiments, the first location includes a first point at which GPS coordinates are known, and the second location includes a third point at which GPS coordinates are known.

In some embodiments, the effective radius at two or more locations can be determined. The locations for which effective radii are determined can be selected from a group including the first location, the second location, and the third location. The calculated effective radii can be compared and determined to be within a calibration range. In some embodiments, the calibration range is specified as less than one percent (1%). In some embodiments, the calibration range is specified as less than five percent (5%). In some embodiments, the specified calibration range is more than one percent (1%).

Another embodiment of the present disclosure includes a coordinates extrapolation system (CES) for determining GPS coordinates corresponding to a location at which GPS signals are unavailable. The CES can include a processor; a GPS receiver; and a memory in communication with the processor and the GPS receiver. The memory can be configured to store instructions, the instructions being executable by the processor to use a GPS signal receiver to determine coordinates that correspond to a first location; use the GPS signal receiver to determine coordinates that correspond to a second location; measure a distance from the second location to a third location, wherein the GPS signal receiver cannot receive a GPS signal at the third location; determine a vector on a plane that is substantially tangential to the second location; and extrapolate, using the vector and the distance between the second location and the third location, coordinates that correspond to the third location.

In some embodiments, the instructions stored by the memory further include instructions, executable by the processor to determine at least two basis vectors of a tangential plane that is substantially tangential to the second location. The instructions stored by the memory can also include instructions, executable by the processor to determine an angle $\alpha$ between a first line and a second line, wherein the first line passes through the first location and the second location, and the second line passes through the second location and the third location.

In some embodiments, the instructions stored by the memory further include instructions, executable by the processor to extrapolate, using the vector, the angle $\alpha$, and the distance between the second location and the third location, GPS coordinates that correspond to the third location.

In some embodiments, the instructions stored by the memory further include instructions, executable by the processor to verify the calibration of the CES by determining the effective radius a two or more of locations selected from a group including the first location, the second location, and the third location, and verifying that the effective radius at the two or more of locations are within a calibration range.

According to another embodiment of the present disclosure, a computer readable medium includes computer readable instructions. The computer readable instructions, when executed, can perform the steps of: using a GPS signal receiver to determine coordinates that correspond to a first location; using the GPS signal receiver to determine coordinates that correspond to a second location; measuring a distance from the second location to a third location, wherein the GPS signal receiver cannot receive a GPS signal at the third location; determining a vector on a plane that is substantially tangential to the second location; and extrapolating, using the vector and the distance between the second location and the third location, coordinates that correspond to the third location.

In some embodiments, the computer readable medium further includes instructions that, when executed, perform the step of determining an angle α between a first line and a second line. The first line can pass through the first location and the second location, and the second line can pass through the second location and the third location.

In some embodiments, the computer readable medium further includes instructions that, when executed, perform the steps of extrapolating, using the vector, the angle α, and the distance between the second location and the third location, GPS coordinates that correspond to the third location.

In some embodiments, the computer readable medium further includes instructions that, when executed, perform the steps of determining the effective radius at two or more locations selected from a group including the first location, the second location, and the third location, and verifying that the effective radius at the two or more locations are within a calibration range.

DETAILED DESCRIPTION

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

Figure 1:
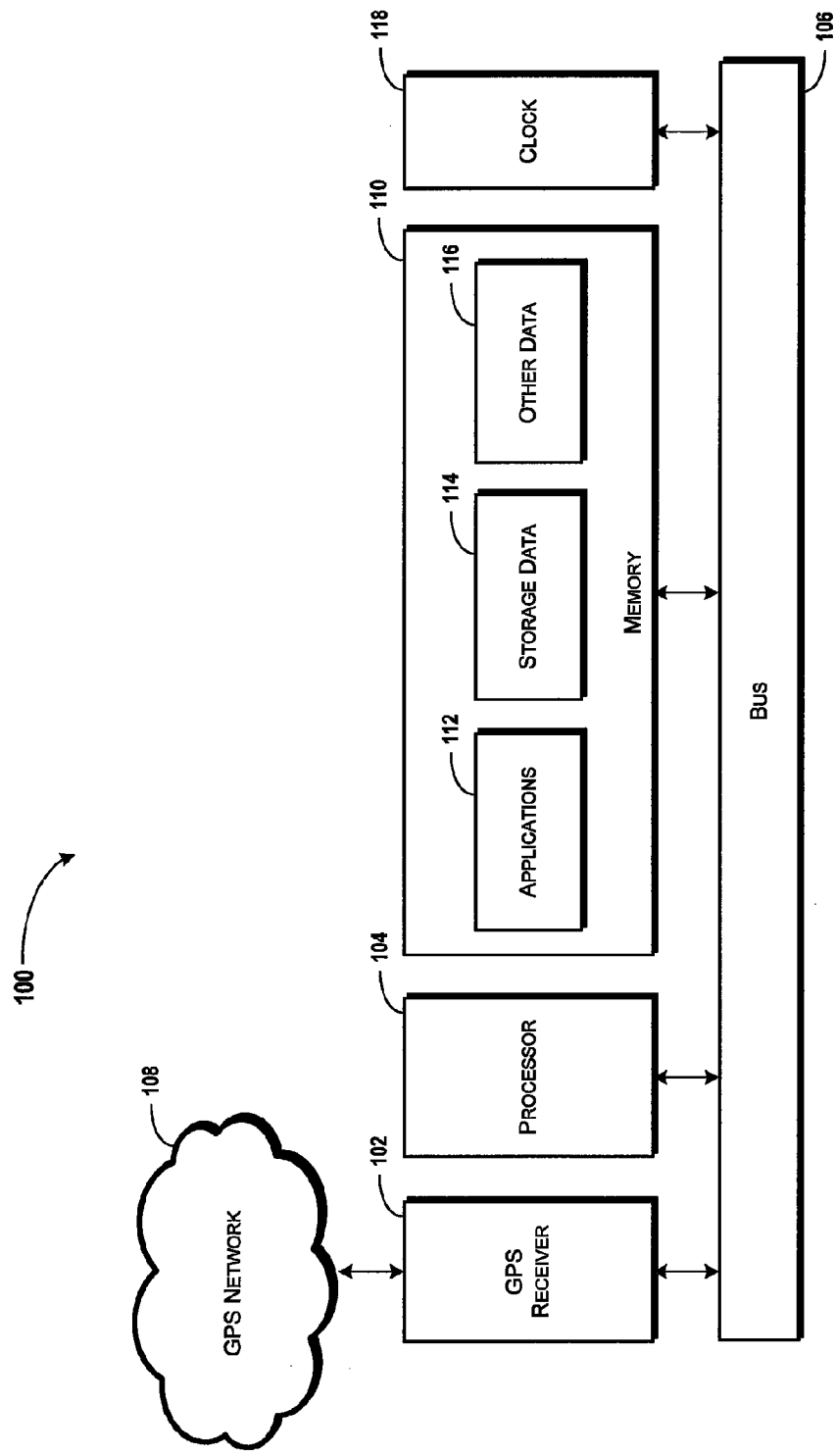
FIG. 1 schematically illustrates a coordinate extrapolation system, according to an exemplary embodiment of the present disclosure.

Referring now to the drawings wherein like numerals represent like elements throughout the drawings, FIG. 1 schematically illustrates a block diagram of a coordinate extrapolation system 100 (CES) according to an exemplary embodiment of the present disclosure. The illustrated CES 100 includes one or more GPS receivers 102 that are operatively linked and in communication with one or more processors 104 via one or more data/memory busses 106. The GPS receiver 102 can receive signals from one or more GPS system transmitters of a GPS network 108, for example, a GPS satellite (not illustrated). It should be appreciated that the CES 100 can reside on a mobile device, for example, a laptop computer, a palmtop computer, a mobile telephone, an automobile navigation system, a handheld GPS receiver, combinations thereof, and the like. The processor 104 is operatively linked and in communication with a memory 110 via the data/memory bus 106.

The word "memory," as used herein to describe the memory 110, collectively includes all memory types associated with the CES 100 such as, but not limited to, processor registers, processor cache, random access memory (RAM), other volatile memory forms, and non-volatile, semi-permanent or permanent memory types; for example, tape-based media, optical media, flash media, hard disks, combinations thereof, and the like. While the memory 110 is illustrated as residing proximate the processor 104, it should be understood that the memory 110 can be a remotely accessed storage system, for example, a remote hard disk drive, a removable storage medium, combinations thereof, and the like. The illustrated memory 110 can include one or more applications 112, stored data 114, and/or other data 116.

The applications 112 can include programs, routines, subroutines, algorithms, software, tools, and the like, for determining, extrapolating, and storing location data. For example, the applications 112 can include a trilateration application for determining location by using, for example, three or more GPS signals. The applications 112 can also include an extrapolation application for extrapolating coordinates for a location at which GPS signals are unavailable, inaccurate, degraded, or otherwise unreliable. Exemplary instructions for extrapolating position will be described in more detail below with reference to FIGS. 2-6.

The stored data 114 can store data for use during determination and use of location data, for example. As such, the stored data 114 can include, for example, GPS coordinates, GPS transmitter information, time data, GPS signal transmitters relied upon in determining location, combinations thereof, and the like. The stored data 114 can be correlated to one or more locations and retrieved by the CES 100 when data associated with a location is requested.

The other data 116 can include, for example, RF signal measurements associated with locations, map data, algorithms, an operating system (OS), one or more programs for providing a user interface, combinations thereof, and the like. Additionally, or alternatively, the other data 116 can include, for example, tables of data. In some embodiments, for example, the other data 116 includes table values of cosine, sine, and other functions, or CORDIC, for use by extrapolation equations. Including tables and/or matrices of sine and cosine values, for example, can decrease the intensity of extrapolation calculations, and/or increase the speed of extrapolation applications, by relieving the processor 104 of making sine and cosine calculations.

Although not illustrated in FIG. 1, the CES 100 can include additional hardware, for example, a display, long-range and short-range transmitters, receivers, and/or transceivers, video and audio input/output (I/O) devices, subscriber identity modules (SIM's), power interfaces, user I/O devices, video imaging devices, and the like. As such, the other data 116 can include additional applications, programs, software, and the like, for providing functionality via other hardware of the CES 100, for example. In some embodiments, the CES 100 is included in a cellular telephone. In some embodiments, the CES 100 is included in a portable computing device such as, for example, a laptop computer or a PDA. Note that these devices may also include supplementary instruments such as magneto-resistive compasses, for example, a Honeywell HMC5843, micro-machined silicon accelerometers, for example Analog Devices ADXK330, or solid-state gyroscopes, for example, Systron SDG-1000, to improve accuracy during GPS occlusions or drop-outs due to unfavorable satellite positions that may improve tracking during so-called "dead reckoning" intervals. Exact use of these devices is not delineated here, but will be obvious to those skilled in the art.

The CES 100 can also include a clock 118, for use in determining location by measuring the time at which GPS signals are received. The CES 100 can compare the time the GPS signal is received with the time at which the GPS signal was sent, thereby determining the amount of time that passed from transmission to reception. Since the speed of radio waves is known, knowing the amount of time that passed from GPS signal transmission to GPS signal reception allows the CES 100 to calculate the distance from the CES 100 to the GPS signal transmitter. As explained above, several GPS signals can be used to determine the distances from various GPS signal transmitters, thereby allowing the CES 100 to determine its position.

Some GPS receivers include built-in errors to prevent highly accurate GPS readings from being generated. These errors can be built into the clock 118, or into other software or hardware operating on the CES 100. In many applications, a more accurate clock 118 can help generate more accurate GPS location information, but these built-in errors may or may not still exist in location readings. As such, it should be understood that principles of the present disclosure can be employed regardless of the accuracy and/or precision of the clock 118, and regardless of the presence or absence of other built-in errors.

Figure 2:
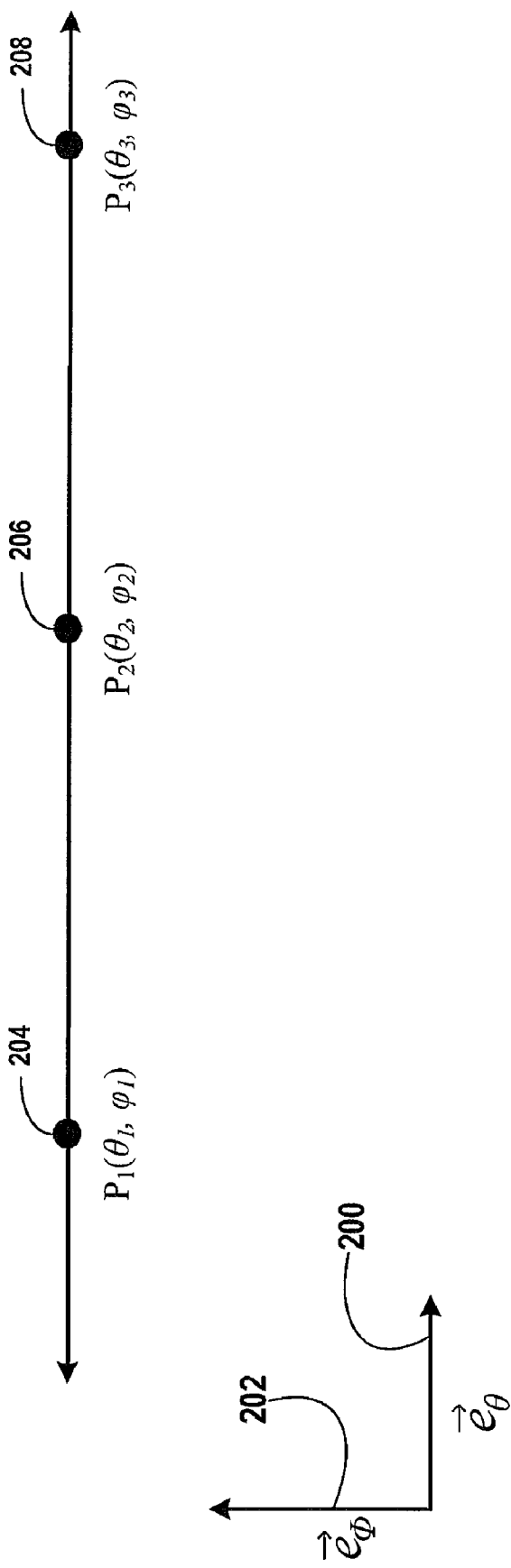
FIG. 2 schematically illustrates an exemplary scenario in which embodiments of the present disclosure can be implemented, according to an exemplary embodiment of the present disclosure.

FIG. 2 schematically illustrates an exemplary scenario in which principles of the present disclosure can be implemented. In FIG. 2, two vectors, $e_\theta$ 200, and $e_\phi$ 202 can define a plane in which three substantially co-planar points $P_1$ 204, $P_2$ 206, and $P_3$ 208 are modeled.

The three points $P_1$ 204, $P_2$ 206, and $P_3$ 208, are generally not actually coplanar points. Rather, the three points $P_1$ 204, $P_2$ 206, and $P_3$ 208 represent three points on the earth's surface that are modeled as existing in a plane that is tangential to at least one known reference point. For example, the reference point can be the point $P_1$ 204 or the point $P_2$ 206. As such, the reference points can be points at which the CES 100 determined GPS location using GPS signals.

In accordance with an exemplary embodiment of the present disclosure, a CES 100 is used to determine GPS coordinates associated with the point $P_1$ 204. At point $P_1$ 204, various operations can be performed, for example, RF signal levels, and the like, can be measured and stored by the CES 100. The measured data can be associated with the location of point $P_1$ 204. Similarly, the CES 100 can be used to determine GPS coordinates associated with the point $P_2$ 206. At point $P_2$ 206, various operations can be performed, stored by the CES 100, and associated with the location of point $P_2$ 206. At point $P_3$ 208, various operations can be performed, stored by the CES 100, and associated with the location of point $P_3$ 208. However, in the illustrated example, the CES 100 is not able to determine the GPS coordinates associated with the point $P_3$ 208.

GPS signals are often lost in built-up areas, for example, in cities and other metropolitan areas where artificial structures such as skyscrapers, bridges, tunnels, and the like, block GPS signals. GPS signals can also be degraded due to cloud cover, atmospheric interference, low power of a GPS receiver, and the like. Regardless of the cause, the GPS coordinates associated with the point $P_3$ 208 cannot be determined. As such, the CES 100 needs to determine the location based upon the information it has available.

Figure 3:
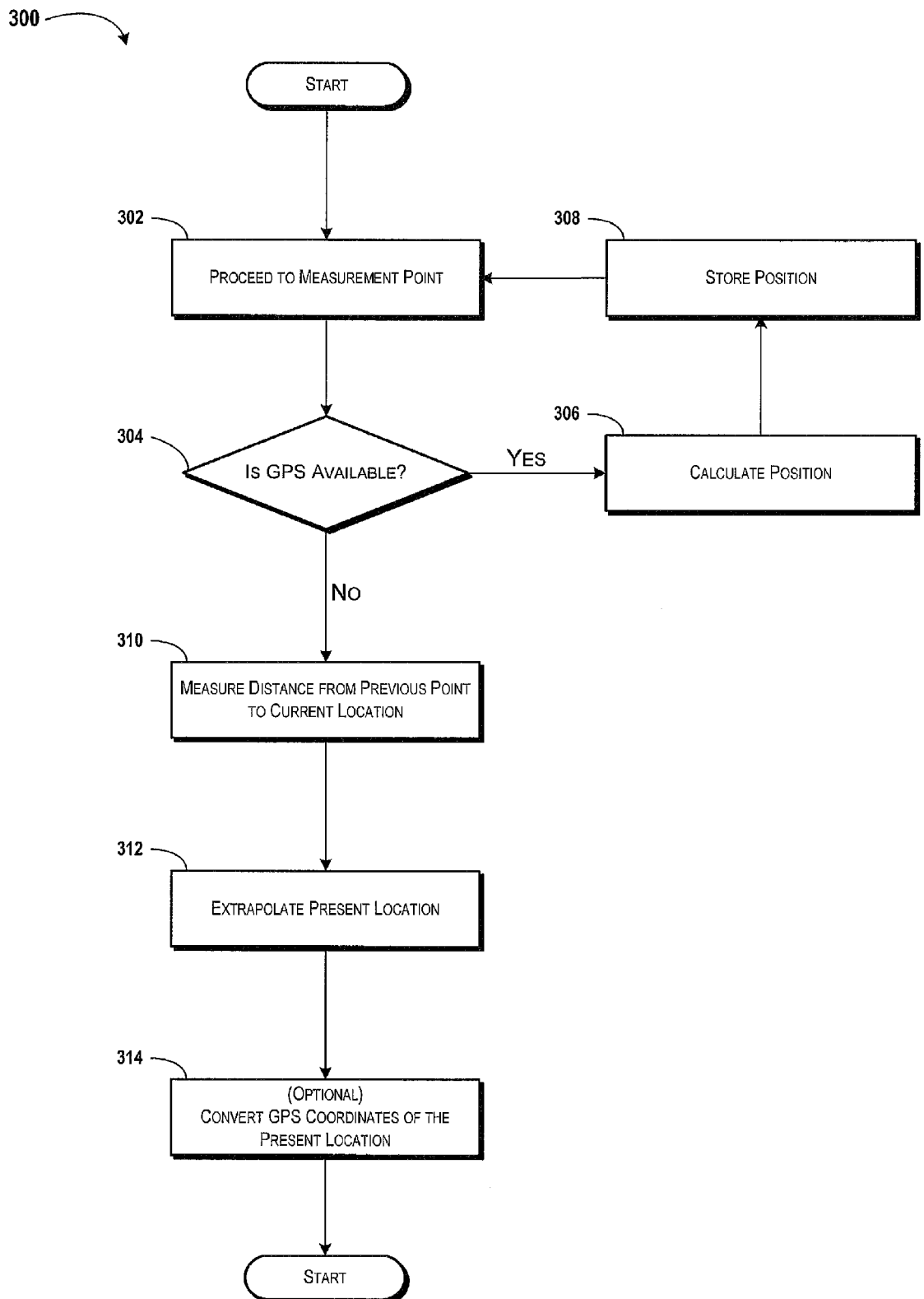
FIG. 3 schematically illustrates a method for determining the GPS coordinates associated with a point, according to an exemplary embodiment of the present disclosure.

FIG. 3 schematically illustrates a method 300 for determining the GPS coordinates associated with a point 208 at which GPS signals are unavailable, according to an exemplary embodiment of the present disclosure. It should be understood that the steps described are not necessarily presented in any particular order and performance of some or all the steps in an alternative order(s) is possible and is contemplated. The steps have been presented in the demonstrated order for ease of description and illustration. Steps can be added, omitted and/or performed simultaneously without departing from the scope of the appended claims. Some or all steps of this process, and/or substantially equivalent steps, can be performed by execution of computer-readable instructions included on a computer readable medium.

The method 300 begins and flow proceeds to block 302, wherein a CES 100 is used at a data measurement point. At block 304, the CES 100 determines if GPS signals are available. If the CES 100 can receive GPS signals, then the GPS receiver determines the current location, as illustrated at block 306, the current location is stored in a memory location, as illustrated at block 308, and the method can return to block 302. Although not illustrated, if there are no more measurement points, the method 300 can end.

With reference to the exemplary scenario illustrated in FIG. 2, blocks 302-308 have occurred at least twice, and the locations $P_1$ 204 and $P_2$ 206 have been determined and stored. At point $P_3$ 208, the CES 100 is unable to receive GPS signals, and therefore, at block 304, the CES 100 is unable to determine the current location based upon received GPS data. As such, the method 300 proceeds to block 310, wherein the distance from the last known location to the present location is determined.

The distance from the last known location can be determined in a number of ways. In some embodiments, the distance from the last known location can be measured using tape measures, laser or optical range finders, tachymeters, tacheometers, transits, theodolites, measurement wheels, odometers, pedometers, maps, combinations thereof, and the like as well as electronic instruments as discussed above. In some embodiments, the distance between two measurement points can be a known, consistent, and/or standard measurement. As such, the distance between the last known location and the present measurement point can be measured, can be known, or can be approximated within an acceptable range of an expected distance value. Depending upon the application for which GPS coordinates are desired, the acceptable range of approximated distances can be from about five centimeters (5 cm) to about five meters (5 m).

The method 300 can proceed to block 312, wherein the location of the point $P_3$ 208 can be extrapolated. It should be appreciated that for purposes of extrapolating the location of point $P_3$ 208, the three points $P_1$ 204, $P_2$ 206, and $P_3$ 208 can be modeled as being substantially collinear, and can be modeled as being located on the same plane, namely a tangential plane modeled at a point at which GPS signals are available. As such, the extrapolation of the location of the point $P_3$ 208 can be determined based, at least partially, upon the location of at least one known point $P_1$ 204 or $P_2$ 206. In some embodiments, the extrapolation of the location of point $P_3$ 208 can be based upon the location of at least two known points $P_1$ 204 and $P_2$ 206. In some embodiments, the CES 100 uses location data and one or more applications 112 to determine the location of the point $P_3$ 208.

The one or more applications 112 can be stored in the memory 110 of the CES 100, and can include software, programs, algorithms, logic, data tables, and/or a combination thereof for extrapolating the coordinates of the point $P_3$ 208. In some embodiments, the data tables can include tables for sine and cosine at various measured $\alpha$ values. In some embodiments, the extrapolation application uses two known points $P_1$ 204 or $P_2$ 206 to determine $\delta f_{21}$, i.e., $\theta_2 - \theta_1$, and $\delta \phi_{21}$, i.e., $\phi_2 - \phi_1$. The extrapolation application can use the determined $\delta \theta_{21}$ and $\delta \phi_{21}$ values to extrapolate the $\theta_3$ and $\phi_3$ corresponding to the point $P_3$ 208. In some embodiments, the extrapolation application includes instructions for determining $\theta_3$ and $\phi_3$ using instructions stored in a memory 110 of the CES 100. In some embodiments, the instructions stored in the memory 110 include instructions that allow the CES 100 to determine $\theta_3$ and $\phi_3$ by assuming that:

$$\theta_3 = \theta_2 + \frac{d}{R\gamma}\delta\theta_{21}$$

and $$\varphi_3 = \varphi_2 + \frac{d}{R\gamma}\delta\varphi_{21},$$

where $$\gamma = \sqrt{\delta\theta_{21}^2 + \sin^2(\theta_2)\delta\varphi_{21}^2}$$

At block 314, the determined coordinates $(\theta_3, \phi_3)$ can be converted to latitude and longitude. In some embodiments, the CES 100 determines latitude and longitude based upon $\theta_3$ and $\phi_3$. For example, latitude can be determined as being substantially equal to $90° - \theta_3$, and longitude can be determined as being substantially equal to $\phi_3$.

Although not shown in FIG. 3, the method 300 can include a calibration step wherein the effective radius can be computed using:

$$\tilde{R}_\theta = \frac{d}{\gamma}\frac{\delta\theta_{21}}{\delta\theta_{32}},$$

$$\tilde{R}_\varphi = \frac{d}{\gamma}\frac{\delta\varphi_{21}}{\delta\varphi_{32}},$$

where $$\gamma = \sqrt{\delta\theta_{21}^2 + \sin^2(\theta_2)\delta\varphi_{21}^2} \text{ and } \tilde{R}_\theta \approx \tilde{R}_\varphi$$

Calibration can take into account that for a correctly operating GPS unit, the radii $\tilde{R}_\theta$ and $\tilde{R}_\phi$ should be within a few percent of each other. The effective radii can be calculated and compared. If the calculated radii are within an acceptable variance of one another, then the determined coordinates can be assumed to be correct. In some embodiments, the acceptable variance is less than 1%. In some embodiments, the acceptable variance is less than 5%. The method 300 can end.

Figure 4:
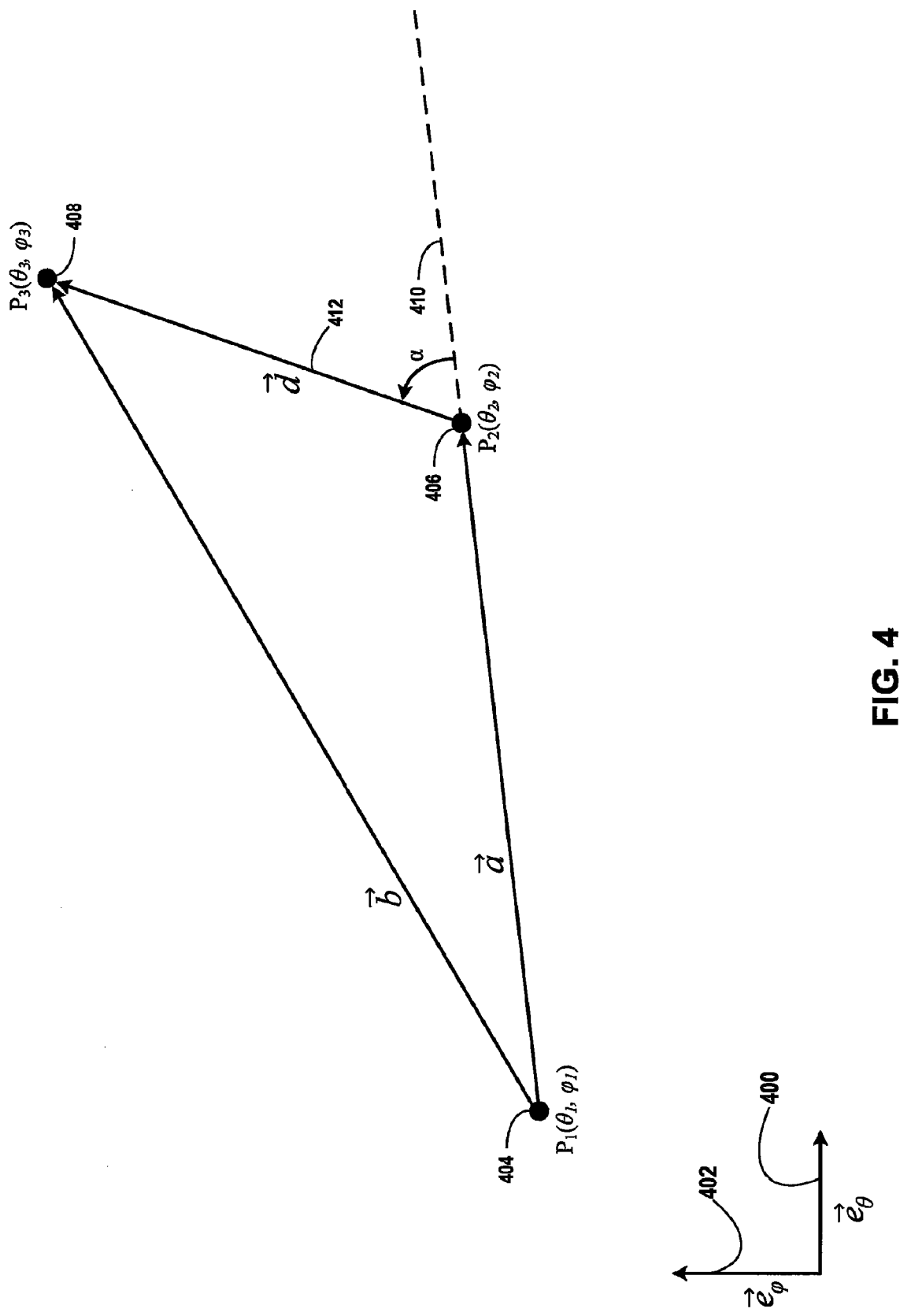
FIG. 4 schematically illustrates another exemplary scenario in which embodiments of the present disclosure can be implemented, according to an alternative exemplary embodiment of the present disclosure.

FIG. 4 schematically illustrates another exemplary scenario in which principles of the present disclosure can be implemented. In FIG. 4, two vectors, $e_\theta$ 400, and $e_\phi$ 402 define a plane in which three substantially co-planar points 404, 406, 408 are modeled. As explained above, the three points are generally not coplanar, but actually represent three points on the earth's surface that are modeled as being coplanar.

In accordance with an exemplary embodiment of the present disclosure, a CES 100 is used to determine GPS coordinates associated with the point $P_1$ 404. At point $P_1$ 404, various operations can be performed, for example, RF signal levels, and the like, can be measured and stored as associated with the location of point $P_1$ 404. Similarly, the CES 100 can be used to determine GPS coordinates associated with the point $P_2$ 406. At point $P_2$ 406, various operations can be performed and associated with the location of point $P_2$ 406. At point $P_3$ 408, various operations can be performed and associated with the location of point $P_3$ 408. However, in the illustrated example, the CES 100 is not able to receive GPS signals at the point $P_3$ 408, and therefore, the CES 100 is unable to directly determine the GPS coordinates associated with the point $P_3$ 408.

As explained above, the CES 100 may be unable to receive GPS signals for a number of reasons including, but not limited to, being transferred into a built-up area, a tunnel, having low power, excessive cloud cover, electrical interference, and the like. The CES 100 can be used to determine the coordinates of the present location, without relying on GPS signals.

The CES 100 can use, for example, an extrapolation application to determine the coordinates of the point $P_3$ 408. The extrapolation application, as will be described in more detail below, can use several inputs to provide the extrapolation functionality. A first reference line 410 that passes through points $P_1$ 404 and $P_2$ 406 can be determined. A second reference line 412 that passes through points $P_2$ 406 and $P_3$ 408 can also be determined. The angle $\alpha$ between the first reference line 410 and the second reference line 412 can be determined. The angle $\alpha$ can be determined using, for example, a transit or theodolite.

Figure 5:
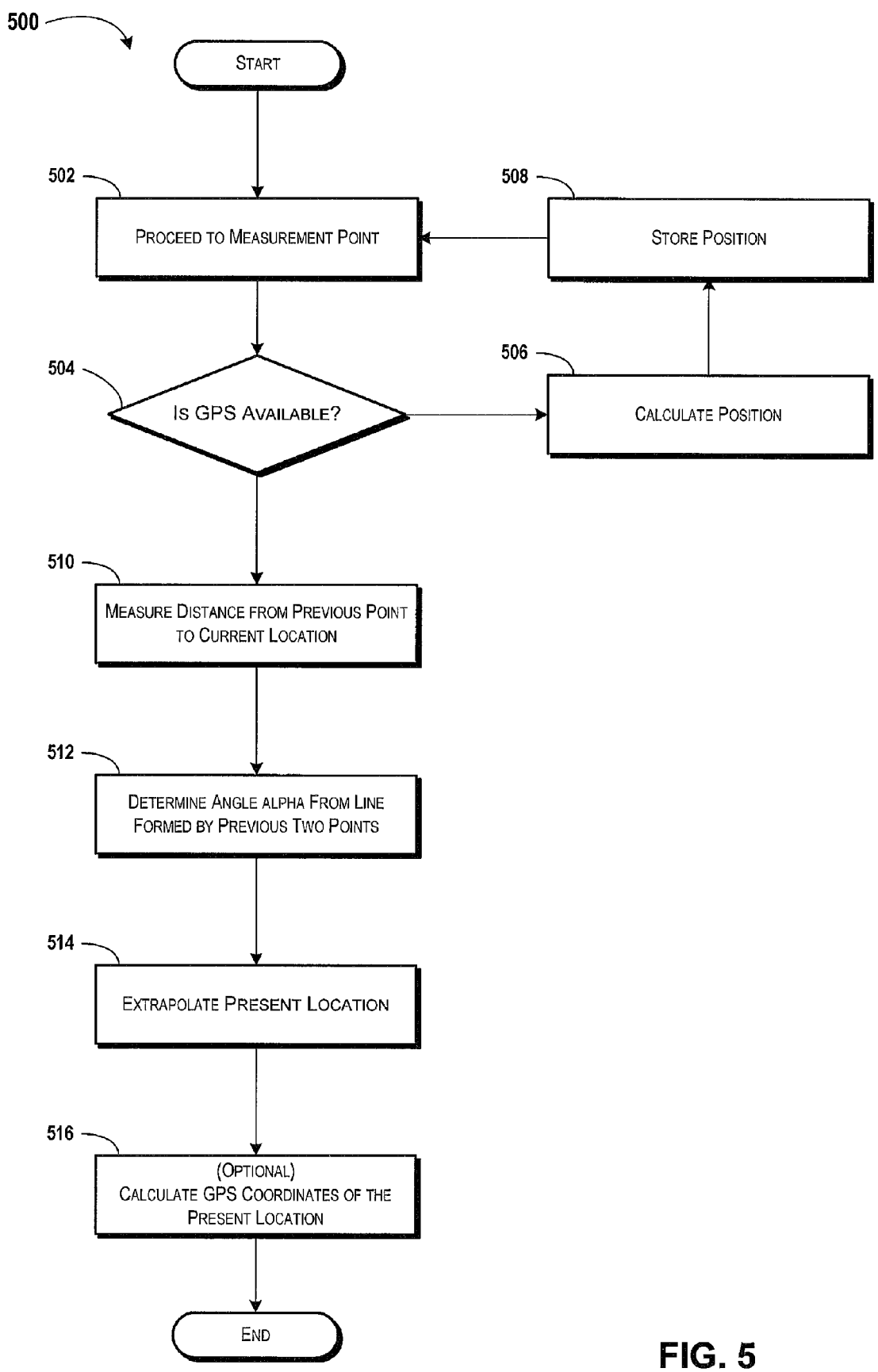
FIG. 5 schematically illustrates a method for determining the GPS coordinates associated with a point, according to an alternative exemplary embodiment of the present disclosure.

FIG. 5 schematically illustrates a method 500 for determining the GPS coordinates associated with a point 408 that is co-planar with respect to two points 404, 406 for which GPS coordinates are known. It should be understood that the steps described are not necessarily presented in any particular order and performance of some or all the steps in an alternative order(s) is possible and is contemplated. The steps have been presented in the demonstrated order for ease of description and illustration. Steps can be added, omitted and/or performed simultaneously without departing from the scope of the appended claims. Some or all steps of this process, and/or substantially equivalent steps, can be performed by execution of computer-readable instructions included on a computer readable medium.

The method 500 begins and flow proceeds to block 502, wherein a CES 100 is activated at a data measurement point. At block 504, the CES 100 determines if GPS signals are available. If the CES 100 can receive GPS signals, then the GPS receiver determines the current location, as illustrated at block 506, the current location is stored in a memory location, as illustrated at block 508, and the method can return to block 502. Although not illustrated, if there are no more measurement points, the method 500 can end.

With reference to the exemplary scenario illustrated in FIG. 4, blocks 502-508 have occurred at least twice, and the locations $P_1$ and $P_2$ have been determined and stored. At point $P_3$, the CES 100 is unable to receive GPS signals and directly determine the current location at block 504. As such, the method 500 proceeds to block 510, wherein the distance from the last known location is determined, as explained above with respect to the method 300 of FIG. 3.

As illustrated at block 512, a line that passes through points $P_1$ and $P_2$, and a line that passes through points $P_2$ and $P_3$ can be determined, and the angle α between the two determined lines can be determined. It should be understood that the lines are determined to the extent that the angle α can be determined, but line equations, graphical representations, and the like, are not necessary to complete the method 500.

As illustrated at block 514, the location of the third point can be extrapolated. The location of the point $P_3$ 408 can be extrapolated. The location of the point $P_3$ 408 can be extrapolated based, at least partially, upon the location of one or more known points, for example, one or more of the known points $P_1$ 404 or $P_2$ 406. In some embodiments, a first reference line 410 passes through the points $P_1$ 404 and $P_2$ 406. Additionally, a second reference line 412 passes through points $P_2$ 406 and $P_3$ 408. The first reference line and the second reference line are rotationally offset by the angle α. In some embodiments, the extrapolation is based upon at least the two known points $P_1$ 404 and $P_2$ 406, and the angle α. In some embodiments, the CES 100 uses one or more applications 112 to determine the location of the point $P_3$ 408, as explained in more detail below.

The one or more applications 112 can be stored in the memory 110 of the CES 100, and can include software, programs, algorithms, logic, data tables, and/or a combination thereof for extrapolating the coordinates of the point $P_3$ 408. In some embodiments, the data tables can include tables for sine and cosine at various measured α values. In some embodiments, the extrapolation application uses two known points $P_1$ 404 or $P_2$ 406 to determine 6021, i.e., $\theta_2-\theta_1$, and $\delta\phi_{21}$, i.e., $\phi_2-\phi_1$. The extrapolation application can use the determined $\delta\theta_{21}$ and $\delta\phi_{21}$ values to extrapolate the $\theta_3$ and $\theta_3$ corresponding to the point $P_3$ 408. In some embodiments, the extrapolation application determines $\theta_3$ and $\phi_3$ using:

$$\theta_3 = \theta_2 + \frac{d}{R\gamma}(\cos(\alpha)\delta\theta_{21} - \sin(\alpha)\sin(\theta_{1or2})\delta\varphi_{21})$$

and $$\varphi_3 = \varphi_2 + \frac{d}{R\gamma}\left(\cos(\alpha)\delta\varphi_{21} + \sin(\alpha)\frac{1}{\sin(\theta_{1or2})}\delta\theta_{21}\right),$$

where $$\gamma = \sqrt{\delta\theta_{21}^2 + \sin^2(\theta_2)\delta\varphi_{21}^2}$$

At block 516, the determined coordinates ($\theta_3$, $\phi_3$) can be converted to latitude and longitude, i.e., latitude=90°−$\theta_3$, and longitude=$\phi_3$. The method 500 can end.

Figure 6:
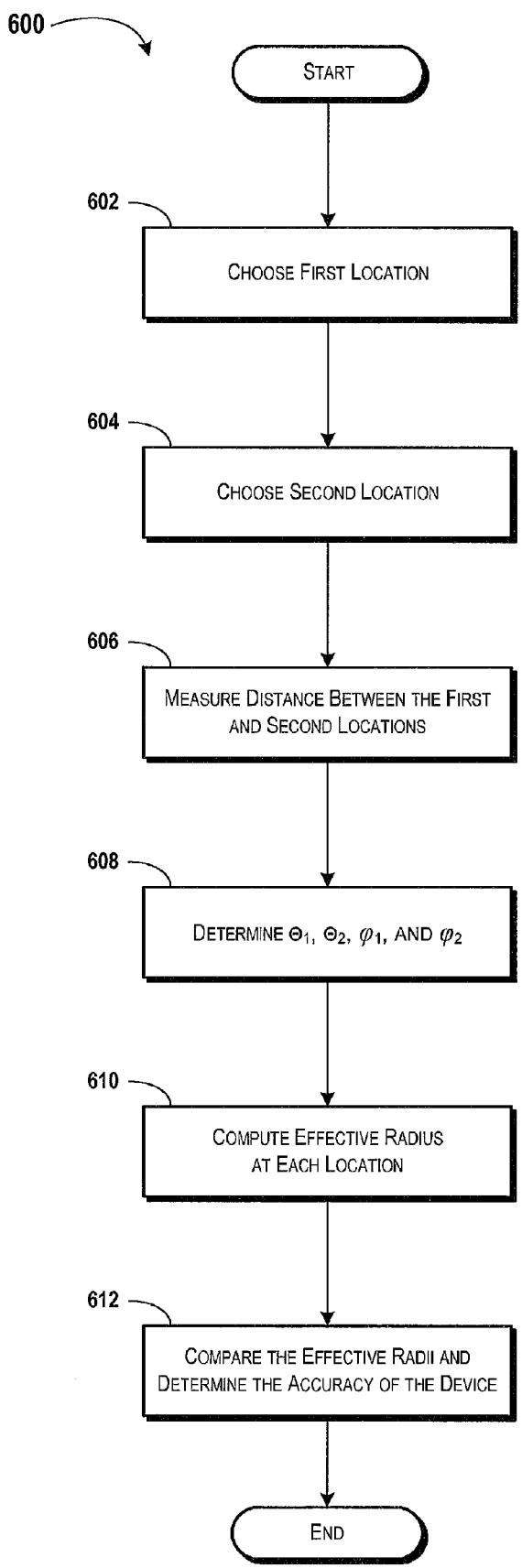
FIG. 6 schematically illustrates a method for performing a calibration process, according to an exemplary embodiment of the present disclosure.

Turning now to FIG. 6, a method 600 for performing a calibration process is schematically illustrated, according to an exemplary embodiment of the present disclosure. It should be understood that the steps described are not necessarily presented in any particular order and performance of some or all the steps in an alternative order(s) is possible and is contemplated. The steps have been presented in the demonstrated order for ease of description and illustration. Steps can be added, omitted and/or performed simultaneously without departing from the scope of the appended claims. Some or all steps of this process, and/or substantially equivalent steps, can be performed by execution of computer-readable instructions included on a computer readable medium.

The method 600 begins, and flow begins to block 602, wherein a first location is chosen. The first location can be chosen from among any points at which coordinates data is available. In the above-described embodiments, the first location could represent any of the points represented in FIGS. 2 and 4, for example. At block 604, a second location is chosen. The second location can be chosen from among any points at which coordinates data is available, except for a point corresponding to the first location. For purposes of illustration, and not limitation, the method 600 will be described herein as if the location corresponding to the point $P_1$ 204 is selected for the first location, and the point $P_2$ 206 is selected for the second location.

At block 606, the distance $d_{21}$, which is the distance from the first location to the second location, is measured. The distance $d_{21}$ can be measured using rangefinders, tape measures, odometers, pedometers, transits, and the like, as described above with reference to FIGS. 3 and 5. At block 608, $\theta_1$, $\theta_2$, $\phi_1$, and $\phi_2$ can be determined for the first and second locations, wherein $\theta_1$=90°−Latitude$_1$, $\theta_2$=90°−Latitude$_2$, $\phi_1$=Longitude$_1$, and $\phi_2$=Longitude$_2$. The latitude and longitude for the first location and the second location may have been generated with a GPS receiver, or using methods and systems such as those disclosed herein and described with reference to FIGS. 2-5. As shown at block 610, the effective radius R, based upon the first location and second location, can be computed as:

$$R = \frac{d_{21}}{\sqrt{\delta\theta_{21}^2 + \sin^2(\theta)\delta\varphi_{21}^2}}$$

For a correctly operating GPS unit, the radius at each point should be within a few percent of each other. The effective radius can be determined at each point, and the difference between the effective radius at each location can be compared and the accuracy of the readings can be determined, as shown at block 612. As explained above, determining the accuracy of the readings can include verifying that the effective radius is consistent within a determined variance of one another. In some embodiments, the determined variance is 1% or less. In some embodiments, the determined variance is 5% or less. The method 600 can end.

Figure 7:
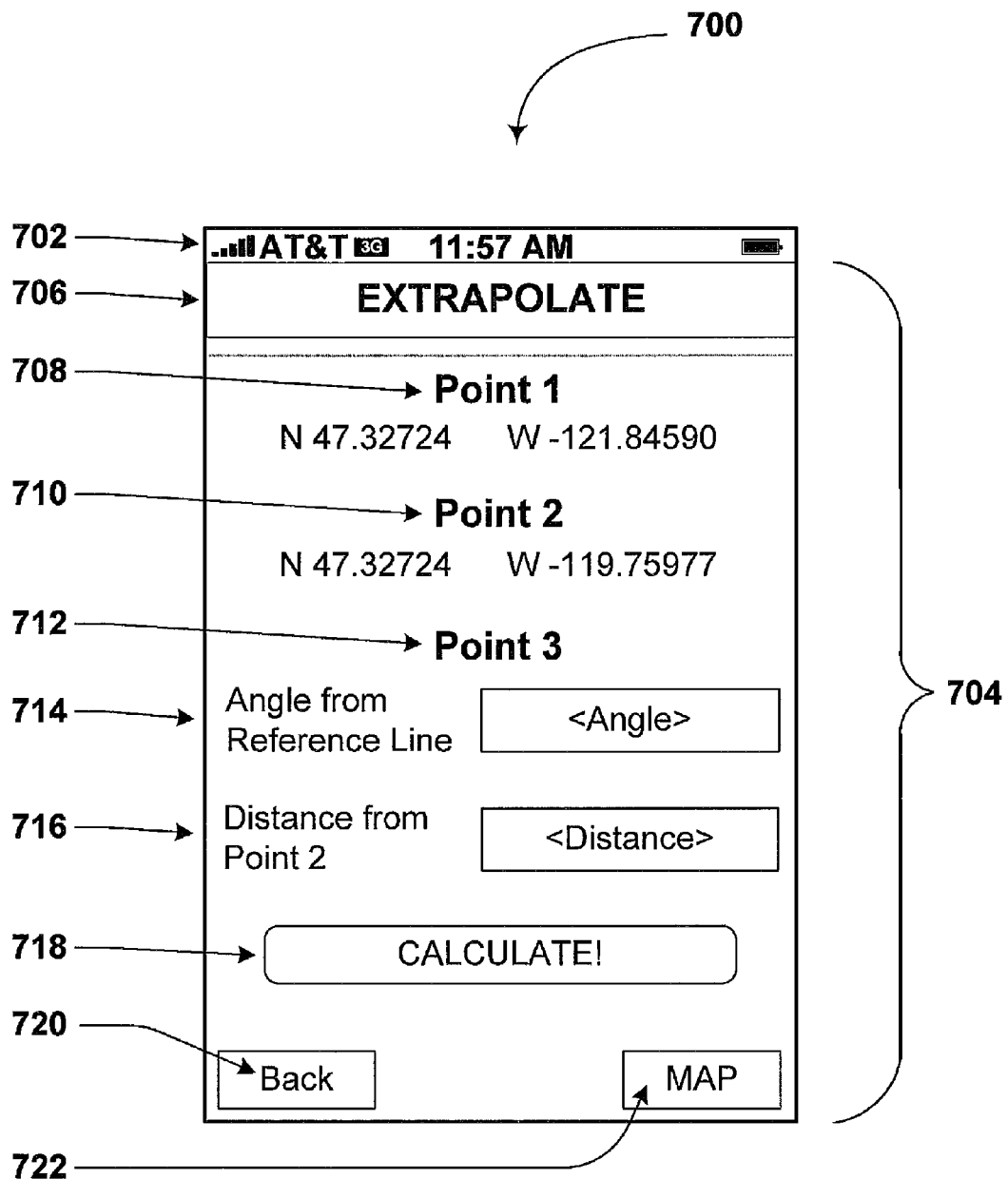
FIG. 7 illustrates a graphical user interface (GUI) for providing an interface with which to control a GPS receiver, according to an exemplary embodiment of the present disclosure.

FIG. 7 illustrates an exemplary graphical user interface (GUI) 700 for interfacing with a user of the CES 100 to provide some or all of the functionality described in FIGS. 2-6. In some embodiments, the GUI 700 is displayed by a video output source on a display of the CES 100. In the exemplary embodiment of FIG. 7, the CES 100 is included as an application running on a mobile communications device. This embodiment is exemplary only, and that the CES 100 can be included on handheld GPS receivers, smartphones, personal digital assistants (PDA's), laptop computers, palmtop computers, electronic range finders with GPS capability, combinations thereof, and the like.

In the illustrated embodiment, the GUI 700 includes operational information 702 for the mobile communications device. The operational information 702 can include network information, for example, a signal meter for displaying the measured strength of a network signal, and information relating to the network with which the mobile communications device is in communication. In the illustrated GUI 700, the mobile communications device is indicating a maximum signal strength and that the mobile communications device is currently connected to the AT&T 3G (third generation) network. It should be understood that this indication is exemplary only. The GUI 700 can be used on devices operating on other networks, other protocols, and/or operated by other carriers. The operational information 702 can also include, for example, the time of day, a date, a message waiting indicator, a battery meter, a short range radio communications device indicator, an alarm indicator, other information, and the like.

The GUI 700 includes a coordinate extrapolation interface 704 for interfacing with a user to generate GPS coordinates for a point at which the CES 100 cannot receive GPS signals. The coordinate extrapolation interface 704 includes a title portion 706 for indicating to a user the function currently being performed by the mobile communications device. As explained above, the CES 100 can be used to determine and store GPS coordinates at measurement points. As such, the GUI 700 can present the previous two locations for which the GPS coordinates were determined. In the exemplary GUI 700, these two points are presented to the user with respective coordinates in a first field 708 for the first point, and a second field 710 for the second point, for example. The coordinate extrapolation interface 704 can also include a third field 712 for the third point. The third field 712 can include two text entry boxes 714, 716 into which the angle α and the distance from the previous point can be entered, respectively. The GUI 700 includes an option 718 to calculate the GPS coordinates of the third location based upon the entered information and the stored locations.

The GUI 700 can include various options, for example, an option 720 to go back to a previous screen, an option 722 for viewing the known and/or determined locations on a map, additional and/or alternative options (not illustrated), combinations thereof, and the like.

In some embodiments, the CES 100, or a device that includes the CES 100, can include a user interface that allows a user to capture the coordinates associated with the current location. The coordinates can be captured on demand, at certain intervals, during measurement. For example, when the user stops to take a measurement, the user can select a "capture coordinates" option. The CES 100 can be included in a measurement device, if desired, which can simplify correlation of the measured data and the coordinates at which the data was measured.

Additionally, or alternatively, the CES 100, or a device that includes the CES 100, can track distance traveled between measurement points or points at which coordinates have been captured. As such, the distance traveled between a point at which the CES 100 can determine location and a point at which the CES 100 cannot determine location may be automatically stored by the CES 100. Configuring the CES 100 to measure the distance traveled can relieve the user from taking, entering, estimating, or otherwise obtaining distance measurements. In some contemplated embodiments, movement of the CES 100 is determined based at least partially upon network triangulation, accelerometer measurements, pedometer measurements, device velocity, a planed route, time tracking, combinations thereof, and the like.

The CES 100, or a device that includes the CES 100, can store the measurement point coordinates and the measured data at the measurement points. Upon demand, the CES 100 can transmit the data to a desired user, device, network, system, and combinations thereof. In some embodiments, the CES 100 formats and sends one or more email messages. The data can be attached to the email message in a desired format. The data can include, but is not limited to, coordinates data, measurements taken, correlation data relating measured data to coordinates data, date of measurements, time of day, the user, a project name, combinations thereof, and the like. In some embodiments, the CES 100 formats and sends one or more MMS messages, SMS messages, or other messages to one or more designated recipients, devices, and/or systems.

The coordinates of the measurement points, the readings gathered or otherwise measured at those measurement points, and the like, can be plotted on a map, if desired. The memory 110 of the CES 100 can include map data and one or more mapping applications, if desired.

The above description has generally described extrapolation based upon two known points and a third unknown point, wherein the GPS coordinates for the first two points encountered are known, and the GPS coordinates for the third point encountered are not known. It should be appreciated that extrapolation according to the present disclosure can be based upon, for example, two points for which GPS coordinates are known and a third point at which GPS coordinates are not known, wherein the points are encountered in alternative orders.

For example, concepts of the present disclosure can be applied to determine GPS coordinates for a first location at which GPS coordinates are not known, based, at least partially, upon second and third locations at which GPS coordinates are known. Similarly, concepts of the present disclosure can be applied to determine GPS coordinates for a second location at which GPS coordinates are not known, based, at least partially, upon first and third locations at which GPS coordinates are known.

It should also be appreciated that concepts of the present disclosure can be used to find more than one unknown point at which GPS signals are not available, and can use more than two known points. For example, if the GPS coordinates corresponding to two or more points are known, then the GPS coordinates for more than one additional points can be determined using the locations of the two or more known points and the distance from at least one point for which GPS coordinates are known to a point for which GPS coordinates are not known.

It will be appreciated that a location for which GPS coordinates have been extrapolated can be used as a known point for later extrapolation of GPS coordinates for other locations at which GPS signals are unavailable. It is, therefore, possible to use concepts of the present disclosure to determine GPS coordinates for multiple locations at which GPS signals are unavailable.

The embodiments of the CES 100 described above have been described as including applications 112 stored at a memory 110 local to or associated with the CES 100. In some embodiments of the present disclosure, one or more location applications, including, but not limited to, the extrapolation applications described above, can be stored at a remote location. In some embodiments, the remote location includes a server located on a cellular network. The CES 100 can communicate with the server to determine location.

For example, the CES 100 can be embodied in a mobile communications device, for example, a cellular phone. The distances between points and angles such as, for example, the angles A, can be input to the mobile communications device. The mobile communications device can transmit to a node of the cellular network, the measured distances and angles. The node can pass the distances and angles to an extrapolation application residing on the cellular network, the Internet, or another network in communication with the cellular network, and the GPS coordinates associated with the locations can be determined.

Similarly, the mobile communications device can communicate GPS coordinates data to the remote system for use by an extrapolation application. Additionally, while the disclosed embodiments have been described primarily with reference to a single CES 100 and/or a single GPS receiver, multiple CES's 100 and/or multiple GPS receivers can be used to determine GPS coordinates at various points. The determined GPS coordinates can then be used by a CES 100 to extrapolate position for a point at which GPS signals are not available. These and other embodiments are included in the scope of the appended claims.

It should be appreciated that the CES 100, the device 108, and/or a single GPS receiver can rely upon standard GPS technology and/or assisted GPS (A-GPS) technologies. As such, the term "GPS," as used in the specification and in the claims, is used to collectively refer to standard GPS and A-GPS systems and methods. It should also be appreciated that providing a CES 100 with A-GPS functionality may require the addition of hardware and/or software such as, for example, cellular antennae, data transfer capabilities, and the like.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method for extrapolating Global Positioning System (GPS) coordinates when GPS signals are not available, comprising:
   using a GPS signal receiver to determine coordinates that correspond to a first location;
   using the GPS signal receiver to determine coordinates that correspond to a second location;
   acquiring data indicating a distance from the second location to a third location, wherein the GPS signal receiver cannot receive a GPS signal at the third location;
   determining a plane that is substantially tangential to the earth's surface at the second location; and
   extrapolating on the plane, using the data indicating the distance between the second location and the third location, GPS coordinates that correspond to the third location.

2. The method of claim 1, wherein the determining further comprises
   determining at least two basis vectors of a tangential plane that is substantially tangential to the earth's surface at the second location.

3. The method of claim 2, further comprising determining an angle α between a first line and a second line, wherein:
   the first line passes through the first location and the second location; and
   the second line passes through the second location and the third location.

4. The method of claim 3, wherein the extrapolating further comprises extrapolating, using the angle α, GPS coordinates that correspond to the third location.

5. The method of claim 4, wherein the first location comprises a second point at which GPS coordinates are known, and the second location comprises a first point at which GPS coordinates are known.

6. The method of claim 4, wherein the first location comprises a first point at which GPS coordinates are known, and the second location comprises a second point at which GPS coordinates are known.

7. The method of claim 4, wherein the first location comprises a first point at which GPS coordinates are known, and the second location comprises a third point at which GPS coordinates are known.

8. The method of claim 1, further comprising:
   determining the effective radius at a plurality of locations selected from a group comprising the first location, the second location, and the third location.

9. The method of claim 8, further comprising:
   verifying that the effective radius at the plurality of locations are within a calibration range.

10. The method of claim 8, further comprising specifying the calibration range as less than one percent (1%).

11. The method of claim 8, further comprising specifying the calibration range as more than one percent (1%).

12. A coordinates extrapolation system (CES) for determining GPS coordinates corresponding to a location at which GPS signals are unavailable, comprising:
   a processor;
   a GPS receiver; and
   a memory in communication with the processor and the GPS receiver, the memory being configured to store instructions, executable by the processor to:
   use a GPS signal receiver to determine coordinates that correspond to a first location;
   use the GPS signal receiver to determine coordinates that correspond to a second location;
   acquire data indicating a distance from the second location to a third location, wherein the GPS signal receiver cannot receive a GPS signal at the third location;
   determine a plane that is substantially tangential to the earth's surface at the second location; and
   extrapolate on the plane, using the distance between the second location and the third location, GPS coordinates that correspond to the third location.

13. The CES of claim 12, wherein the instructions stored by the memory further comprise instructions, executable by the processor to:
   determine at least two basis vectors of a tangential plane that is substantially tangential to the earth's surface at the second location.

14. The CES of claim 12, wherein the instructions stored by the memory further comprise instructions, executable by the processor to:
   determine an angle α between a first line and a second line, wherein:
   the first line passes through the first location and the second location; and
   the second line passes through the second location and the third location.

15. The CES of claim 14, wherein the instructions stored by the memory further comprise instructions, executable by the processor to:
   extrapolate, using the angle α, GPS coordinates that correspond to the third location.

16. The CES of claim 15, wherein the instructions stored by the memory further comprise instructions, executable by the processor to verify the calibration of the CES by:
   determining the effective radius at a plurality of locations selected from a group comprising the first location, the second location, and the third location; and
   verifying that the effective radius at the plurality of locations are within a calibration range.

17. A computer readable medium comprising computer readable instructions that, when executed, perform the steps of:

using a GPS signal receiver to determine coordinates that correspond to a first location;

using the GPS signal receiver to determine coordinates that correspond to a second location;

acquiring data indicating a distance from the second location to a third location, wherein the GPS signal receiver cannot receive a GPS signal at the third location;

determining a plane that is substantially tangential to the earth's surface at the second location; and extrapolating on the plane, using the distance between the second location and the third location, GPS coordinates that correspond to the third location.

18. The computer readable medium of claim 17, wherein the computer readable medium further comprises instructions that, when executed, perform the step of determining an angle α between a first line and a second line, wherein:

the first line passes through the first location and the second location; and the second line passes through the second location and the third location.

19. The computer readable medium of claim 17, wherein the computer readable medium further comprises instructions that, when executed, perform the steps of:

extrapolating, using the angle α, GPS coordinates that correspond to the third location.

20. The computer readable medium of claim 19, wherein the computer readable medium further comprises instructions that, when executed, perform the steps of:

determining the effective radius at a plurality of locations selected from a group comprising the first location, the second location, and the third location; and verifying that the effective radius at the plurality of locations are within a calibration range.

* * * * *